(12) United States Patent
Honda

(10) Patent No.: US 8,833,163 B2
(45) Date of Patent: Sep. 16, 2014

(54) ANGULAR VELOCITY SENSOR

(75) Inventor: Junichi Honda, Miyagi (JP)

(73) Assignee: Sony Corporation, Tokyo (JP)

( * ) Notice: Subject to any disclaimer, the term of this patent is extended or adjusted under 35 U.S.C. 154(b) by 298 days.

(21) Appl. No.: 13/372,053

(22) Filed: Feb. 13, 2012

(65) Prior Publication Data

US 2012/0216613 A1     Aug. 30, 2012

(30) Foreign Application Priority Data

Feb. 25, 2011   (JP) .................................. 2011-040509

(51) Int. Cl.
*G01C 19/56*     (2012.01)
*G01C 19/5747*   (2012.01)

(52) U.S. Cl.
CPC .................................. *G01C 19/5747* (2013.01)
USPC ...................................................... 73/504.12

(58) Field of Classification Search
CPC ........... G01C 19/5642; G01C 19/5656; G01C 19/5719; G01C 19/574
USPC .......................................... 73/504.12, 504.13
See application file for complete search history.

(56) References Cited

U.S. PATENT DOCUMENTS 5,226,321 A * 7/1993 Varnham et al. ............ 73/504.13
5,476,007 A * 12/1995 Nakamura .................. 73/504.12
5,656,777 A * 8/1997 Petri et al. .................. 73/504.12

FOREIGN PATENT DOCUMENTS

JP          11-211481      6/1999
JP          2000-283765    10/2000

* cited by examiner

*Primary Examiner* — John Chapman, Jr.
(74) *Attorney, Agent, or Firm* — K&L Gates LLP

(57) ABSTRACT

An angular velocity sensor includes: a frame including a pair of first beams extending in a first direction and opposed to each other in a second direction orthogonal to the first direction, a pair of second beams extending in the second direction and opposed to each other in the first direction, and connections between those pairs; a drive unit that vibrates the frame in a first plane, to which the first and second directions belong, in a vibration mode in which when one pair of those pairs move closer to each other, the other move away from each other, and vice versa; a first detector that detects, based on the amount of deformation of the frame in the first plane, an angular velocity around an axis of a third direction orthogonal to the first plane; and a support mechanism including a base portion and joint portions.

7 Claims, 12 Drawing Sheets

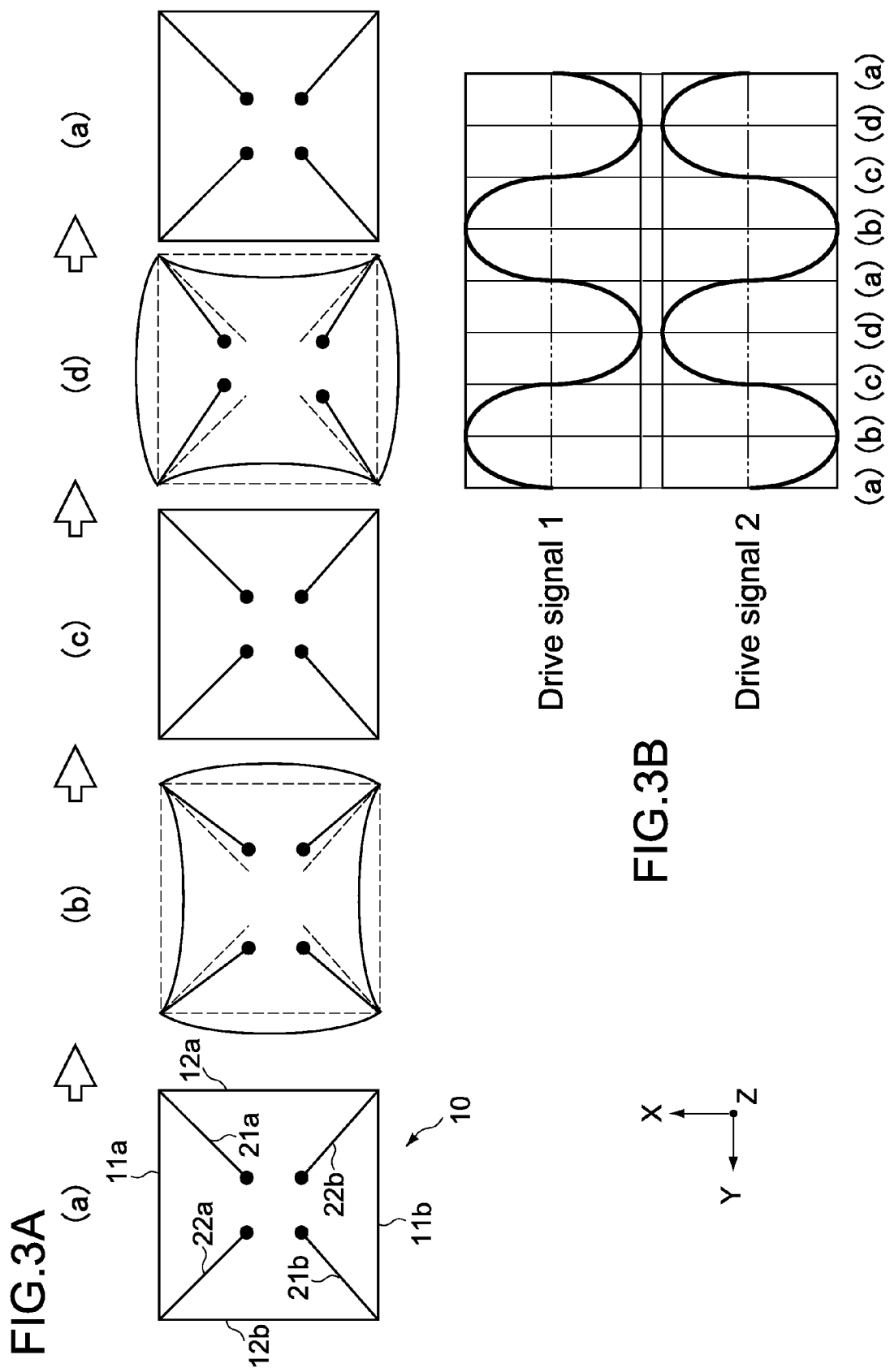

⇨ Vibration direction
➡ Coriolis force

⇒ Vibration direction
→ Coriolis force

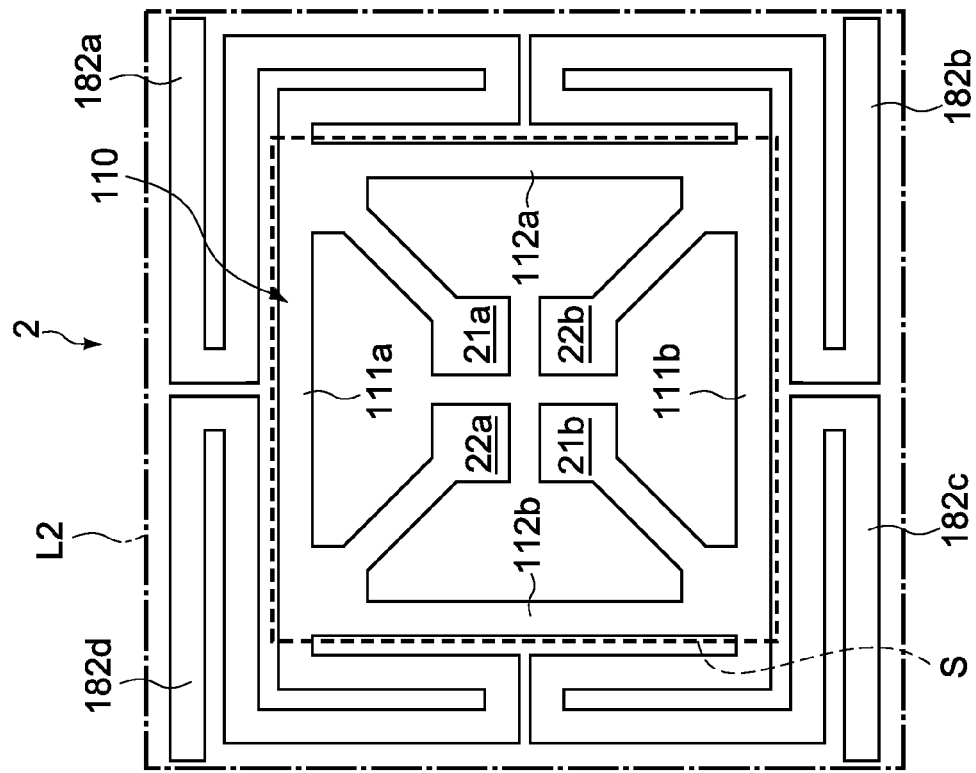
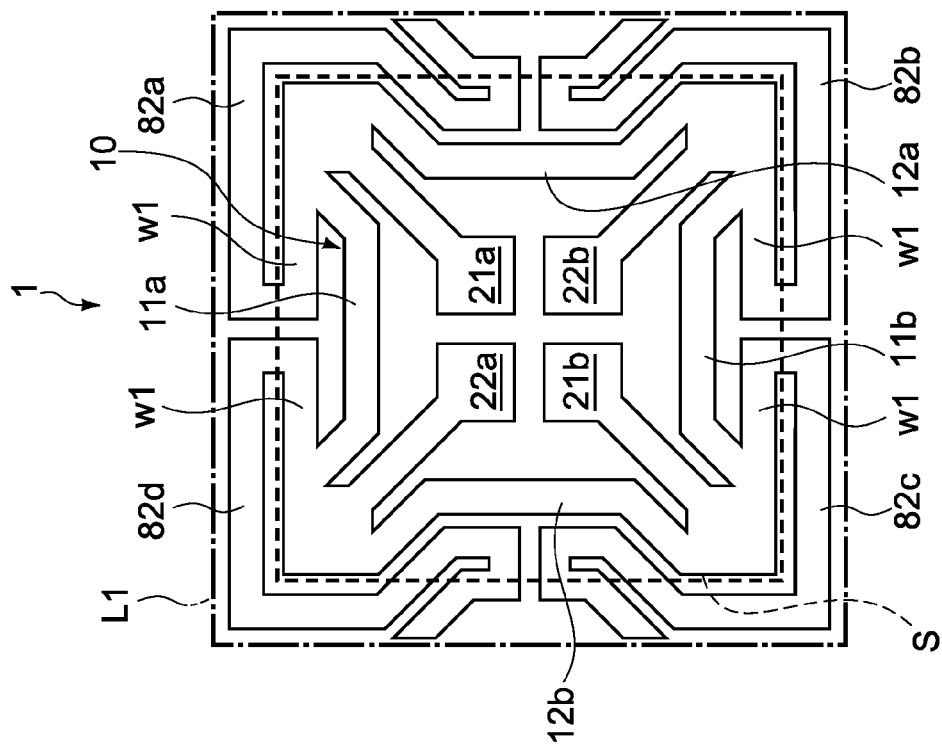
FIG.7A
FIG.7B

ANGULAR VELOCITY SENSOR

CROSS REFERENCES TO RELATED APPLICATIONS

The present application claims priority to Japanese Priority Patent Application JP 2011-040509 filed in the Japan Patent Office on Feb. 25, 2011, the entire content of which is hereby incorporated by reference.

BACKGROUND

The present disclosure relates to an angular velocity sensor to be used for shake detection for a video camera, operation detection in a virtual reality apparatus, and direction detection in a car navigation system, for example.

As a consumer angular velocity sensor, a vibration-type gyro sensor is widely used. The vibration-type gyro sensor vibrates a vibrator at a predetermined frequency in advance and detects a Coriolis force applied to the vibrator by use of a piezoelectric element or the like, to thereby detect an angular velocity. This gyro sensor is incorporated in, for example, an electronic apparatus such as a video camera, a virtual reality apparatus, or a car navigation system and used as a sensor for shake detection, operation detection, direction detection, or the like.

For detecting a posture change in a space by using the gyro sensor of this type, there is known a configuration of arranging gyro sensors along two or three axis directions orthogonal to each other. For example, Japanese Patent Application Laid-open No. HEI 11-211481 (paragraph [0017], FIG. 1) (hereinafter, referred to as Patent Document 1) discloses a configuration allowing three-dimensional angular velocity detection by mounting three gyroscope vibrators on a flexible substrate and bending the flexible substrate such that the three vibrators are orthogonal to each other. Similarly, Japanese Patent Application Laid-open No. 2000-283765 (paragraph [0019], FIG. 8) (hereinafter, referred to as Patent Document 2) discloses a three-dimensional angular velocity sensor including a base on which three three-armed tuning fork vibrators are arranged so as to be orthogonal to each other in three axis directions.

SUMMARY

In recent years, with a reduction in size of an electronic apparatus, it is desirable to reduce the size and thickness of electronic components to be incorporated in the electronic apparatus. However, in the configurations of Patent Documents 1 and 2, one of the three vibrators is arranged such that its longitudinal direction is oriented to a vertical direction (thickness direction), and hence it is difficult to reduce the thickness of the sensor. In addition, it is necessary to suppress a reduction in detection property of an angular velocity due to the reduction in size.

In view of the above-mentioned circumstances, there is a need to provide an angular velocity sensor capable of suppressing a reduction in detection property while achieving a reduction in thickness thereof.

According to an embodiment of the present disclosure, there is provided an angular velocity sensor including an annular frame, a drive unit, a first detector, and a support mechanism.

The frame includes a pair of first beams, a pair of second beams, and a plurality of connections. The pair of first beams extend in a first direction and are opposed to each other in a second direction orthogonal to the first direction. The pair of second beams extend in the second direction and are opposed to each other in the first direction. The plurality of connections connect between the pair of first beams and the pair of second beams.

The drive unit vibrates the frame in a first plane, to which the first direction and the second direction belong, in a vibration mode in which when one pair of the pair of first beams and the pair of second beams move closer to each other, the other pair move away from each other, and when the one pair move away from each other, the other pair move closer to each other.

The first detector detects, based on the amount of deformation of the frame in the first plane, an angular velocity around an axis of a third direction orthogonal to the first plane, the frame vibrating in the vibration mode.

The support mechanism includes an annular base portion including an inner peripheral portion surrounding an outside of the frame and a plurality of joint portions that join between the inner peripheral portion and the plurality of connections.

According to the angular velocity sensor, it is possible to detect the angular velocity around the axis of the third direction, based on deformation of the frame vibrating in the plane orthogonal to the third direction. With this, it is possible to detect an angular velocity around the axis in a thickness direction without increasing a thickness dimension of the sensor, and hence it is possible to achieve a reduction in thickness of the sensor. Further, the plurality of joint portions can be deformed following the vibration of the frame, and hence transmission of vibration between the frame and the base portion is suppressed. With this, for example, it is possible to prevent the detection sensibility of the angular velocity due to disturbance and the like from being fluctuated and to suppress the detection property from being lowered.

As described above, according to the present disclosure, it is possible to suppress a reduction in detection property while achieving a reduction in thickness of the sensor.

These and other objects, features and advantages of the present disclosure will become more apparent in light of the following detailed description of best mode embodiments thereof, as illustrated in the accompanying drawings.

Additional features and advantages are described herein, and will be apparent from the following Detailed Description and the figures.

BRIEF DESCRIPTION OF THE FIGURES

FIG. 3A shows changes over time of basic vibration of a frame of the angular velocity sensor and FIG. 3B shows changes over time of drive signals;

FIG. 7 are plan views for comparing the size of the angular velocity sensor with the size of an angular velocity sensor according to another embodiment of the present disclosure;

DETAILED DESCRIPTION

Hereinafter, embodiments of the present disclosure will be described with reference to the drawings.

First Embodiment

Entire Configuration of Angular Velocity Sensor

Figure 1:
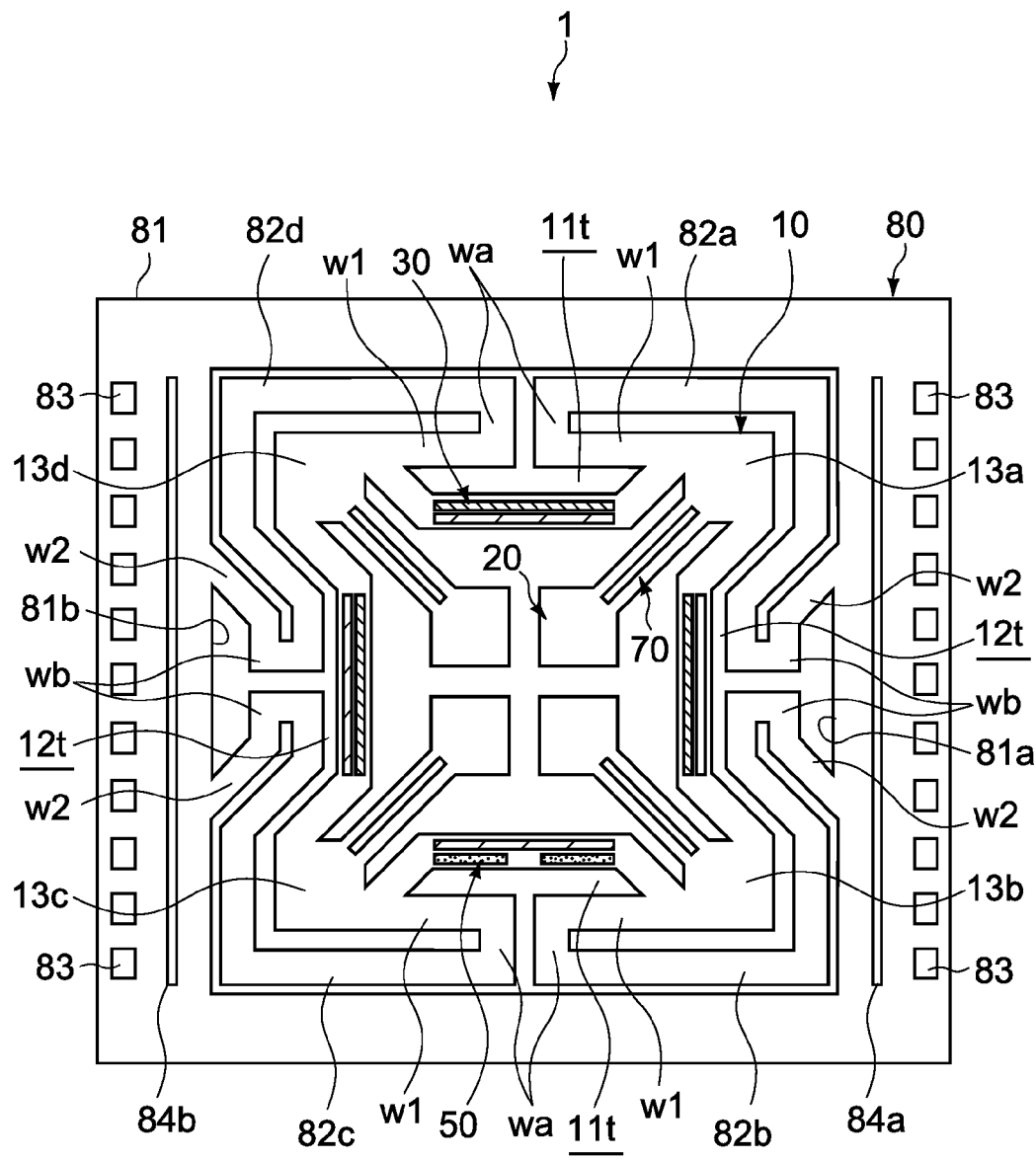
FIG. 1 is a plan view showing an angular velocity sensor according to a first embodiment of the present disclosure.

FIG. 1 is a plan view showing an entire configuration of an angular velocity sensor according to a first embodiment of the present disclosure. The angular velocity sensor 1 has a longitudinal direction in an X-axis direction, a lateral direction in a Y-axis direction, and a thickness direction in a Z-axis direction.

The angular velocity sensor 1 includes a frame 10, pendulums 20, drive units 30, a first detector 50, a second detector 70, and a support mechanism 80. The frame 10 is formed to have a substantially rectangular frame-like shape and the pendulums 20 are fixed at its four corners. The drive units 30 are constituted of piezoelectric elements provided on a top surface of the frame 10 and vibrate the frame 10 in a predetermined vibration mode. The first detector 50 electrically detects deformation of the frame 10 in an XY-plane and outputs a detection signal corresponding to the amount of deformation. The second detector 70 electrically detects deformations, in a direction perpendicular to the XY-plane, of the pendulums 20 and outputs detection signals corresponding to the amounts of deformation. The support mechanism 80 supports the frame 10 without prohibiting the vibration mode and is mounted on a fixing portion such as a wiring substrate.

Next, each portion of the angular velocity sensor will be described in detail.

Figure 2:
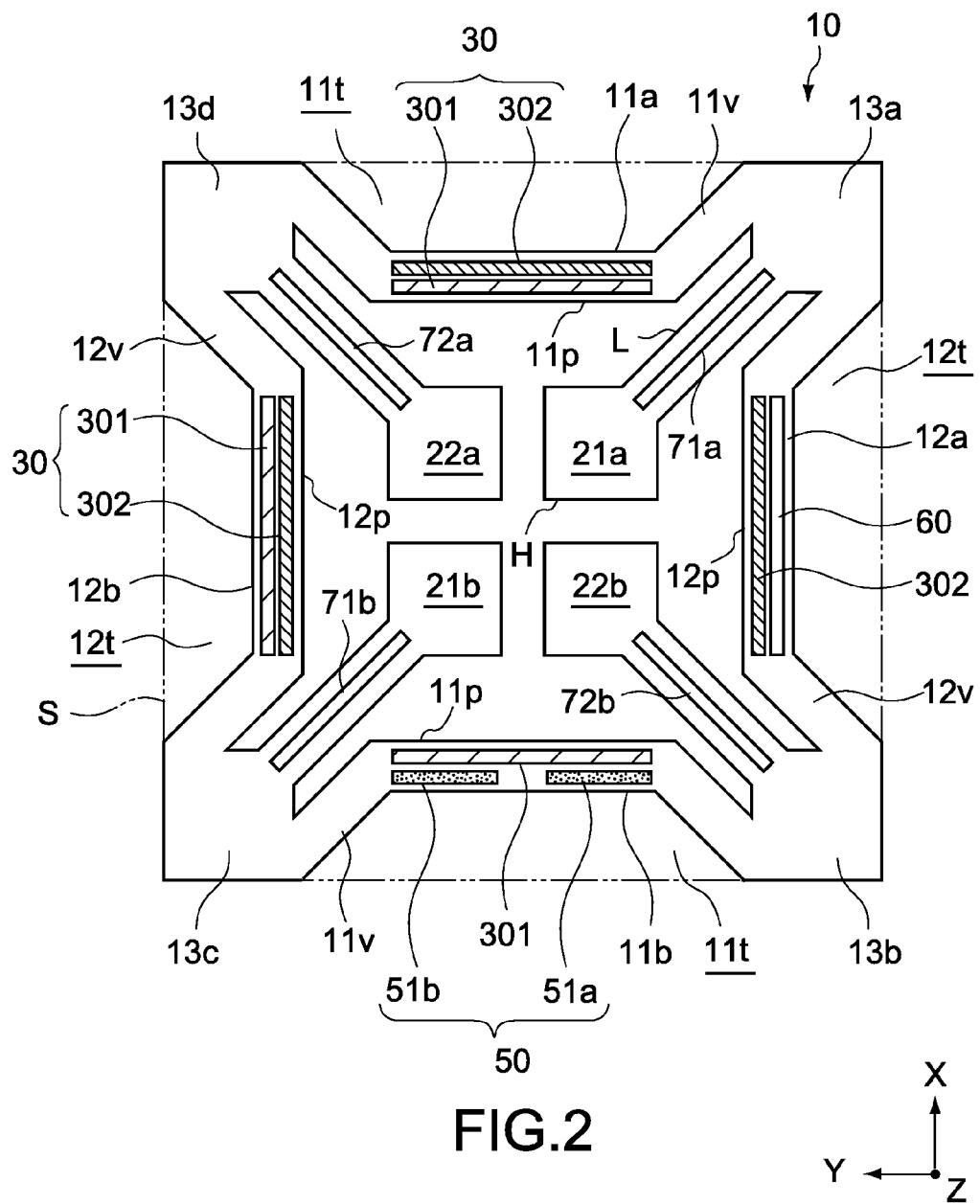
FIG. 2 is a plan view of main parts of the angular velocity sensor.

FIG. 2 is a plan view showing a basic configuration of a drive section of the angular velocity sensor 1. FIG. 2 shows a configuration example of the frame 10, the pendulums 20, the drive units 30, the first detector 50, and the second detector 70 of the angular velocity sensor 1. In the following, the basic configuration of the drive section of this angular velocity sensor will be described with reference to FIG. 2.

[Frame]

Sides of the frame 10 function as vibrating beams and include a pair of first beams 11a and 11b and a pair of second beams 12a and 12b. In FIG. 2, the first beams 11a and 11b extend parallel to each other in the Y-axis direction and are constituted of a pair of sides opposed to each other in the X-axis direction. The second beams 12a and 12b extend parallel to each other in the X-axis direction and are constituted of the other pair of sides opposed to each other in the Y-axis direction. The beams 11a, 11b, 12a, and 12b have the same length, width, and thickness and the outer appearance of the frame 10 has a hollow, substantially square shape.

The frame 10 is formed by subjecting a silicon single crystal substrate to a micro-machining technique. For example, the frame 10 can be formed by using a well-known MEMS (Micro-Electro-Mechanical Systems) manufacturing process. The size of the frame 10 is not particularly limited. For example, the length of one side of the frame 10 ranges from 1000 to 4000 µm, the thickness of the frame 10 ranges from 10 to 200 µm, and the width of each of the beams 11a, 11b, 12a, and 12b ranges from 50 to 200 µm.

In portions corresponding to the four corners of the frame 10, a plurality of connections 13a, 13b, 13c, and 13d that connect between the first beams 11a and 11b and the second beams 12a and 12b are formed. Both ends of the first beams 11a and 11b and the second beams 12a and 12b are supported by the connections 13a to 13d. As will be described later, the beams 11a, 11b, 12a, and 12b function as the vibrating beams whose both sides are supported by the connections 13a to 13d. The four corners of the frame 10 are not limited to an angulated shape as shown in the drawing. The four corners of the frame 10 may be chamfered or may be rounded.

The connections 13a to 13d are arranged at the four corners of the frame 10, the four corners corresponding to corners of the square. In this embodiment, each of the first beams 11a and 11b and the second beams 12a and 12b is curved and formed in a bow shape as a whole, projecting to the inward side of a square S including the connections 13a to 13d as the corners.

In other words, the first beams 11a and 11b include curved portions 11p and inclined portions 11v. The curved portions 11p form recess portions 11t on an outer peripheral side by projecting to a direction (X-axis direction) in which the curved portions 11p are opposed to each other. The inclined portions 11v fix the both ends of the curved portions 11p to the connections 13a to 13d. Similarly, the second beams 12a and 12b include curved portions 12p and inclined portions 12v. The curved portions 12p form recess portions 12t on an outer peripheral side by projecting to a direction (Y-axis direction) in which the curved portions 12p are opposed to each other. The inclined portions 12v fix the both ends of the curved portions 12p to the connections 13a to 13d. The inclined portions 11v and 12v support the curved portions 11p and 12p such that the curved portions 11p and 12p are positioned in the inward side of the square S.

[Pendulum]

The angular velocity sensor 1 includes first pendulums 21a and 21b and second pendulums 22a and 22b.

The first pendulums 21a and 21b are formed in one pair of the connections 13a and 13c (first connections) in a diagonal relationship. The first pendulums 21a and 21b extend in the inside of the frame 10 along the diagonal direction. One end of each of the first pendulums 21a and 21b is fixed to the connection portion 13a or 13c and the other ends of the first pendulums 21a and 21b are opposed to each other near the center of the frame 10.

The second pendulums 22a and 22b are formed in the other pair of the connections 13d and 13b (second connections) in a diagonal relationship. The second pendulums 22a and 22b extend in the inside of the frame 10 along the diagonal direction. One end of each of the second pendulums 22a and 22b is fixed to the connection portion 13d or 13b and the other ends of the second pendulums 22a and 22b are opposed to each other near the center of the frame 10.

The pendulums 21a, 21b, 22a, and 22b typically have the same shape and size and are formed at the same time when the outer shape of the frame 10 is machined. The shape and size of the pendulums 21a, 21b, 22a, and 22b are not particularly limited and the pendulums 21a, 21b, 22a, and 22b do not need to have an identical shape. In this embodiment, the pendulums 21a, 21b, 22a, and 22b include head portions H formed on a free end side and arm portions L that connect between the head portion H and the connections 13a to 13d. The arm portions L are excited in the XY-plane due to vibration of the beams 11a, 11b, 12a, and 12b as will be described later. The head portions H function as vibrating weights for the beams 11a, 11b, 12a, and 12b. It should be noted that formation of the pendulums 21a, 21b, 22a, and 22b may be omitted.

The shape of the frame 10 is not limited to the substantially square shape as described above and may be other quadrangular shapes including a rectangular shape and a parallelogram shape or may be a substantially quadrangular shape equivalent to this. Further, the shape of the frame 10 is not limited to the quadrangular shape and may be other multi-angular shapes including an octagon shape and the like. The beams whose both ends are supported by the connection portions in the four corners may have a linear shape.

[Drive Unit]

The angular velocity sensor 1 includes piezoelectric drive layers as the drive units 30 that vibrate the frame 10. The piezoelectric drive layers include first drive electrodes 301 and second drive electrodes 302. Those drive electrodes 301 and 302 are mechanically deformed depending on an input voltage and then, a driving force due to the deformation vibrates the beams 11a, 11b, 12a, and 12b. A deformation direction is controlled according to the polarity of the input voltage.

The first drive electrodes 301 and the second drive electrodes 302 are linearly formed in top surfaces of the beams 11a, 11b, 12a, and 12b. More specifically, each of the first drive electrodes 301 and each of the second drive electrodes 302 are formed in positions symmetric with respect to an axis of its beam. In FIG. 1, for the sake of easy understanding, the first drive electrodes 301 and the second drive electrodes 302 are shown by different hatchings. In the example shown in the drawing, the first drive electrodes 301 are arranged on an inner edge side of the first beams 11a and 11b and on an outer edge side of the second beam 12b. The second drive electrodes 302 are arranged on an outer edge side of the first beam 11a and on an inner edge side of the second beams 12a and 12b.

The first drive electrodes 301 and the second drive electrodes 302 have the same configuration. The first drive electrodes 301 and the second drive electrodes 302 typically have a stacking structure of a lower electrode layer, a piezoelectric material layer, and an upper electrode layer. The first drive electrodes 301 and the second drive electrodes 302 are formed to each have a thickness of from 0.5 to 3 μm, for example. It should be noted that the frame including the beams on which the drive electrodes are to be formed is made of a silicon single crystal substrate and on the surfaces on which the drive electrodes are to be formed, insulation films such as silicon oxide films are formed in advance.

The piezoelectric material layer is polarized and oriented so as to expand and contract depending on a potential difference between the lower electrode layer and the upper electrode layer. Thus, the lower electrode layer of each of the drive electrodes 301 and 302 is connected to the common reference voltage and to the upper electrode layer of each of the drive electrodes 301 and 302, an alternating-current voltage in opposite phase is applied, with the result that the first drive electrodes 301 and the second drive electrodes 302 expand and contract in opposite phase to each other.

The constituent materials of the lower electrode layer, the piezoelectric material layer, and the upper electrode layer are not particularly limited. For example, the lower electrode layer is constituted of stacked films of titan (Ti) and platinum (Pt), the piezoelectric material layer is constituted of a lead zirconate titanate (PZT), and the upper electrode layer is constituted of platinum. Those layers can be formed by using a thin film manufacturing technique such as a sputtering method, a vacuum evaporation method, or a CVD method. Further, for patterning the formed films, etching using a photolithography technique can be used.

The first drive electrodes 301 and the second drive electrodes 302 may be formed in all of the beams 11a, 11b, 12a, and 12b. Either one of the first drive electrode 301 and the second drive electrode 302 may be formed in each beam. Further, when one beam of the pair of beams opposed to each other vibrates, the vibration is transmitted via the connections of the frame to the other beam, and thus vibration of the other beam can be excited. Therefore, the drive electrode may be arranged only in one beam of the pair of beams opposed to each other.

To the first drive electrode 301 and the second drive electrode 302, voltages in opposite phases are applied such that one expands and the other contracts. With this, the pair of the first beams 11a and 11b are bent and deformed in the X-axis direction with their both ends being supported by the connections 13a to 13d and alternately vibrate in a direction in which they move away from each other and in a direction in which they move closer to each other in the XY-plane. Similarly, the pair of the second beams 12a and 12b are bent and deformed in the Y-axis direction with their both ends being supported by the connections 13a to 13d and alternately vibrate in a direction in which they move away from each other and in a direction in which they move closer to each other in the XY-plane.

Here, in the pair of the first beams 11a and 11b and the pair of the second beams 12a and 12b, a positional relation between each of the first drive electrodes 301 and each of the second drive electrodes 302 arranged on the inner edge side and the outer edge side is opposite. Thus, in the case where (center portions of the opposed beams of) the pair of the first beams 11a and 11b vibrate in the direction in which they move closer to each other, (center portions of the opposed beams of) the pair of the second beams 12a and 12b vibrate in the direction in which they move away from each other. In contrast, in the case where the pair of the first beams 11a and 11b vibrate in the direction in which they move away from each other, the pair of the second beams 12a and 12b vibrate in the direction in which they move closer to each other. At this time, the center portions of the beams 11a, 11b, 12a, and 12b each form a loop of vibration and their end portions (connections 13a to 13d) form nodes of vibration. Hereinafter, such a vibration mode is referred to as basic vibration of the frame 10.

The beams 11a, 11b, 12a, and 12b are driven at their resonant frequency. The resonant frequency of the beams 11a, 11b, 12a, and 12b is defined depending on their shape, length, and the like. As the resonant frequency in the basic vibration of the frame 10 becomes closer to the resonant frequency in angular velocity detection, the detection output can be increased. In the case where an angular velocity around a Z-axis is detected, those two resonant frequencies hardly depend on the thickness of the frame 10, and hence by reducing the thickness of the frame 10, mechanical displacement due to piezoelectric driving can be increased. However, if the frame 10 becomes thin, the mechanical strength of the frame 10 is lowered, and hence the thickness is set so that the reliability as a device can be ensured.

Further, as the operating frequency of the vibrating beams becomes lower, the amplitude of the vibrator is increased, and hence for the angular velocity sensor, high property can be obtained. On the other hand, as the vibrating beams become smaller, the operating frequency therefor tends to be increased. In this embodiment, the resonant frequency of the beams 11a, 11b, 12a, and 12b is set to range from 1 to 100 kHz.

FIG. 3A shows changes over time of the basic vibration of the frame 10 and FIG. 3B shows changes over time of drive signals 1 and 2. In FIG. 3B, a "drive signal 1" corresponds to an input voltage applied to the first drive electrode 301 and a "drive signal 2" corresponds to an input voltage applied to the second drive electrode 302. As shown in FIG. 3B, the drive signal 1 and the drive signal 2 have alternating-current waveforms alternately changing to the opposite phase. With this, the frame 10 changes in an order of (a), (b), (c), (d), (a), and so on in FIG. 3A. The frame 10 vibrates in the vibration mode in which, out of the pair of the first beams 11a and 11b and the pair of the second beams 12a and 12b, when one pair move closer to each other, the other pair move away from each other, and when the one pair move away from each other, the other pair move closer to each other.

It should be noted that there is, in effect, a delayed period of time due to influences of the response period of time, input operating frequency, frame resonant frequency of a piezoelectric member after an input signal is applied until the frame changes (is displaced). In this example, assuming that the delayed period of time is sufficiently short, the changes over time of FIGS. 3A and 3B are described.

With the basic vibration of the frame 10 as described above, the first pendulums 21a and 21b and the second pendulums 22a and 22b vibrate in the XY-plane in synchronism with the vibration of the frame 10 with each of the connections 13a to 13d being the center. The vibration of the pendulums 21a, 21b, 22a, and 22b is excited by the vibration of the beams 11a, 11b, 12a, and 12b. In this case, the first pendulums 21a and 21b and the second pendulums 22a and 22b vibrate (swing) in opposite phase to each other in left- and right-hand swing directions from pivots of the pendulums in the XY-plane, that is, the connections 13a to 13d.

As shown in FIG. 3A, when the pair of the first beams 11a and 11b vibrate in the direction in which they move closer to each other, the first pendulum 21a and the second pendulum 22a vibrate in the direction in which they move away from each other (State (b)), and when the pair of the first beams 11a and 11b vibrate in the direction in which they move away from each other, the first pendulum 21a and the second pendulum 22a vibrate in the direction in which they move closer to each other (State (d)). The first pendulum 21b and the second pendulum 22b also alternately vibrate in the direction in which they move away from each other and in the direction in which they move closer to each other depending on the vibration direction of the pair of the second beams 12a and 12b. As described above, the first pendulums 21a and 21b and the second pendulums 22a and 22b vibrate in opposite phase to each other in synchronism with the basic vibration of the frame 10.

Figure 4A:
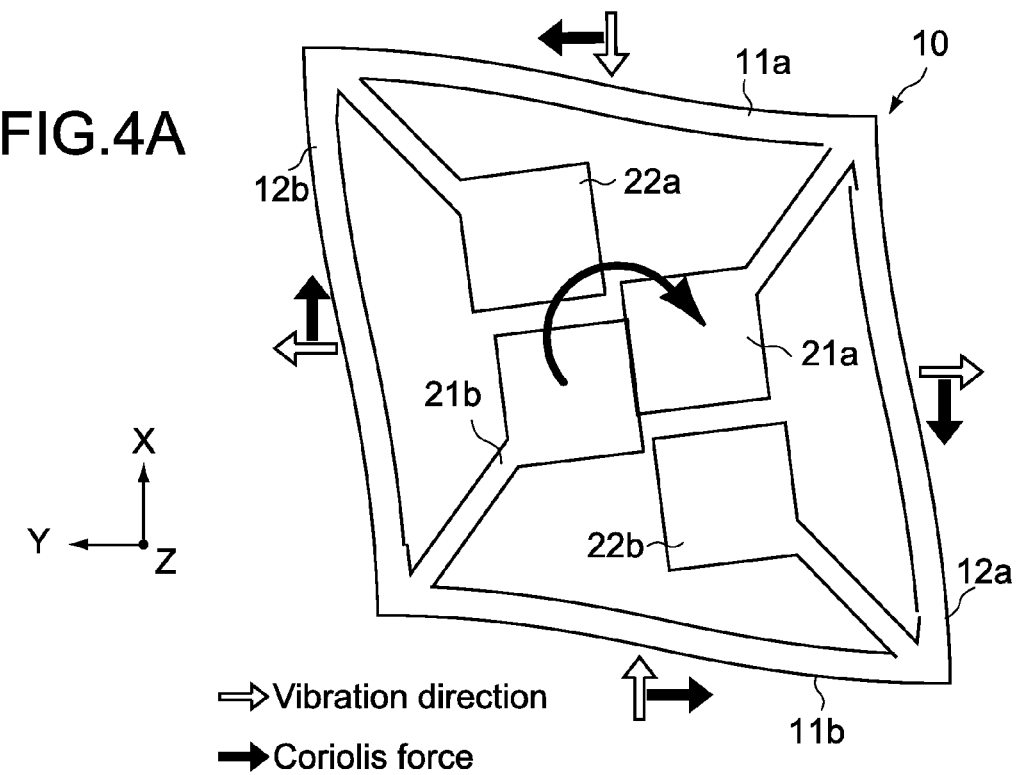
FIG. 4A is a plan view schematically showing a state of deformation of the frame at a certain point of time, on which an angular velocity around the Z-axis acts

In the angular velocity sensor 1 according to this embodiment configured as described above, when alternating-current voltages in opposite phases are applied to the drive electrodes 301 and 302, the beams 11a, 11b, 12a, and 12b of the frame 10 vibrate in the vibration mode shown in FIG. 3A. When an angular velocity around the Z-axis acts on the frame 10 continuing such basic vibration, a Coriolis force due to the angular velocity acts on each point of the frame 10, and thus, the frame 10 is deformed straining in the XY-plane as shown in FIG. 4A. Thus, by detecting the amount of deformation of the frame 10 in the XY-plane, the magnitude and direction of the angular velocity acting on the frame 10 can be detected.

Figure 4B:
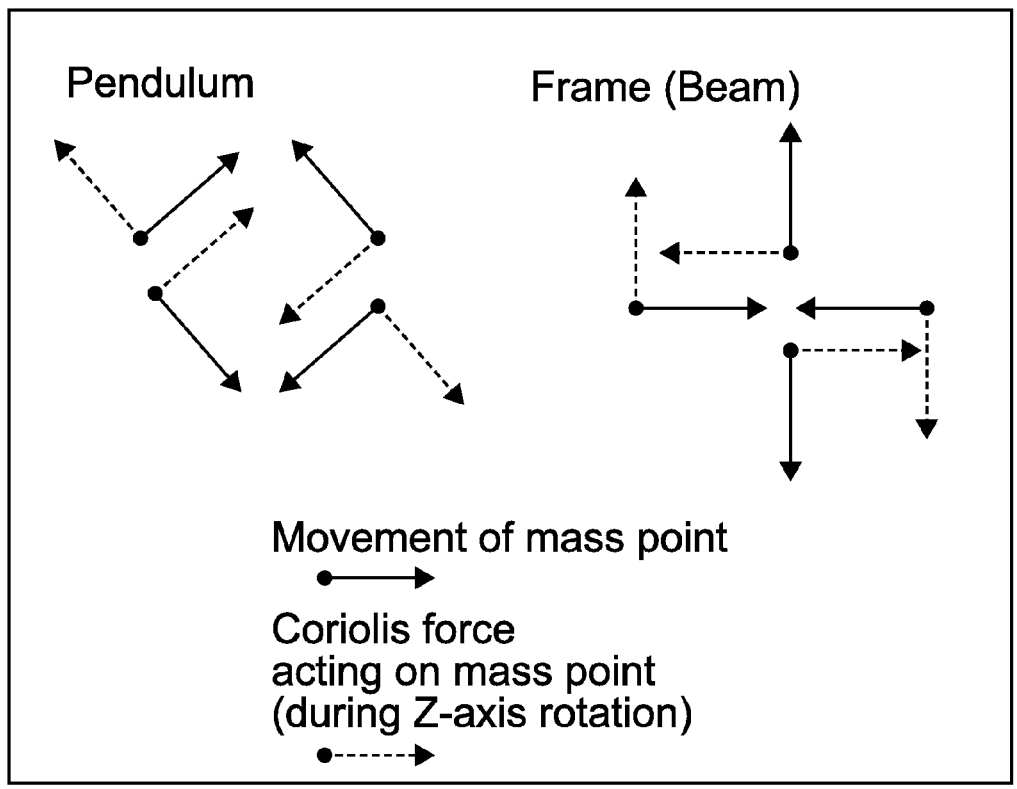
FIG. 4B is a view showing directions of Coriolis forces acting on pendulums and respective portions of the frame in FIG. 4A.

FIG. 4A is a plan view schematically showing a state of deformation of the frame 10 at a certain point of time, on which the angular velocity around the Z-axis acts. FIG. 4B is a view showing directions of Coriolis forces acting on the pendulums and respective portions of the frame in FIG. 4A. It should be noted that for the sake of easy understanding, the shape and state of deformation of the frame 10 are shown slightly exaggerated.

When an angular velocity around a clockwise direction with the Z-axis being the center acts on the frame 10 performing the basic vibration, in respective points (beams 11a, 11b, 12a, and 12b and pendulums 21a, 21b, 22a, and 22b) in the frame 10, Coriolis forces proportional to the magnitude of the angular velocity are generated, in the XY-plane orthogonal to the Z-axis, to directions forming 90 degrees in the clockwise direction with respect to movement directions (vibration directions) of the respective points at the point of time. In other words, the orientations of the Coriolis forces depend on the directions of vibration in the points at the point of time, on which the Coriolis forces act as shown in FIG. 4B. With this, the frame 10 is squashed (strained) in the XY-plane, changing from the square shape to a substantially parallelogram shape.

Here, FIGS. 4A and 4B show a state when a predetermined angular velocity acts about the Z-axis in the clockwise direction. It should be noted that in the case where the orientation of the angular velocity is reversed (counterclockwise direction), the orientation of the Coriolis force acting on each point is also reversed.

[First Detector]

The angular velocity sensor 1 includes the first detector 50 that detects deformation in the XY-plane due to vibration of the frame 10. The first detector 50 includes a first detection electrode 51a and a second detection electrode 51b.

The first detection electrode 51a and the second detection electrode 51b are arranged, on an outer edge side of the first beam 11b, in positions symmetric with respect to a center portion in its axis direction. The first detection electrode 51a and the second detection electrode 51b have the same configuration as those of the drive electrodes 301 and 302. Each of the first detection electrode 51a and the second detection electrode 51b is constituted of a multilayer body of a lower electrode layer, a piezoelectric material layer, and an upper electrode layer and has a function of converting mechanical deformation of the beam 11b to an electrical signal.

As shown in FIG. 4A, when an angular velocity is generated around the Z-axis, the beams 11a, 11b, 12a, and 12b are strained and deformed due to Coriolis forces in the XY-plane. This straining and deformation occurs with respect to the beams 11a, 11b, 12a, and 12b at the same time. Thus, by providing one of the beams with the detection electrodes 51a and 51b, it becomes possible to detect an angular velocity acting on the frame 10.

Further, the detection electrodes 51a and 51b detect not only deformation of the frame 10 due to the angular velocity, but also deformation of the beam 11b in the basic vibration. Here, the deformation of the frame 10, which is associated with generation of the angular velocity, is symmetric with respect to the center portion in the axis direction of each beam. In other words, with the center portion of the beam 11b being a boundary, one area is deformed to have a projecting shape to the inward side of the frame 10 and the other area is deformed to have a projecting shape to the outward side of the frame 10. Therefore, an outer edge side in the one area of the beam 11b contracts and an outer edge side in the other area expands. The first detection electrode 51a and the second detection electrode 51b that are arranged on the outer edge side in those areas output detection signals in opposite phases. Thus, by generating a differential signal of those detection signals, it becomes possible to remove a basic vibration component of the beam 11b and to detect an angular velocity component with high accuracy.

[Reference Electrode]

The angular velocity sensor 1 according to this embodiment includes a reference electrode 60. The reference electrode 60 is arranged on an outer edge side of the second beam 12a, parallel to the drive electrode 302. The reference electrode 60 has the same configuration as those of the drive electrodes 301 and 302. The reference electrode 60 is constituted of a multilayer body of a lower electrode layer, a piezoelectric detection layer, an upper electrode layer and has a function of converting mechanical deformation of the beam 12a to an electrical signal.

The reference electrode 60 is arranged on the outer edge side of the beam 12a and detects vibration of the beam 12a, which is excited by the drive electrode 302. The detection output is used to generate a reference signal for oscillating the frame 10 in the basic vibration. It should be noted that instead of forming the reference electrode 60, a sum signal of outputs from the first detection electrode 51a and the second detection electrode 51b may be generated and the sum signal may be used as the reference signal.

[Second Detector]

The second detector 70 is constituted of four detection electrodes 71a, 71b, 72a, and 72b. The detection electrodes 71a, 71b, 72a, and 72b are arranged on the top surfaces of the arm portions L of the pendulums 21a, 21b, 22a, and 22b, respectively. Each of the detection electrodes 71a, 71b, 72a, and 72b is linearly formed and arranged in an axial center portion of each of the arm portions L, parallel to an extending direction of that arm portion L.

The detection electrodes 71a, 71b, 72a, and 72b have the same configuration as those of the first drive electrodes 301 and the second drive electrodes 302. Each of the detection electrodes 71a, 71b, 72a, and 72b is constituted of a multilayer body of a lower electrode layer, a piezoelectric material layer, and an upper electrode layer and converts mechanical deformation of each of the arm portions L to an electrical signal. In other words, the detection electrodes 71a, 71b, 72a, and 72b each have a function of detecting deformations of the arm portions L in the Z-axis direction.

In this embodiment, one angular velocity detection axis is set in an axis direction parallel to the X-axis and the other angular velocity detection axis is set in an axis direction parallel to the Y-axis. In such a configuration, the detection electrodes 71a, 71b, 72a, and 72b function as detectors for detecting an angular velocity around the X-axis and an angular velocity around the Y-axis.

Figure 5A:
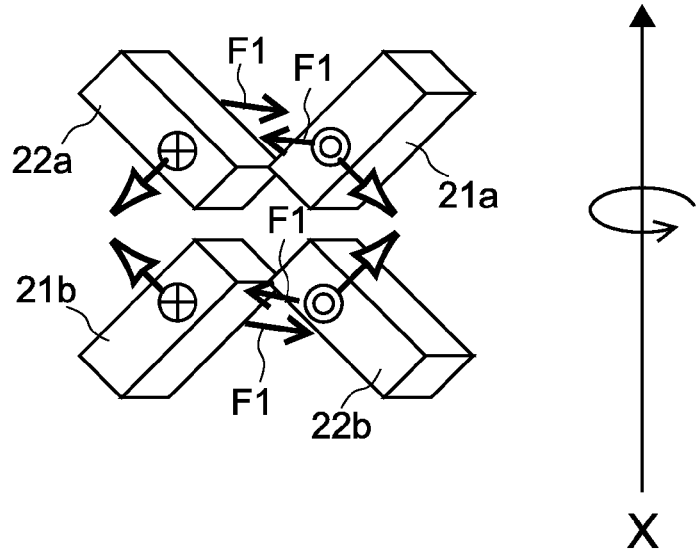
FIG. 5A is a schematic perspective view for illustrating vibration states of the respective pendulums when an angular velocity around the X-axis acts on the frame and FIG. 5B is a schematic perspective view for illustrating vibration states of the respective pendulums when an angular velocity around the Y-axis acts on the frame.

To the drive electrodes 301 and 302, alternating-current voltages in opposite phases are applied. With this, the beams 11a, 11b, 12a, and 12b and the pendulums 21a, 21b, 22a, and 22b of the frame 10 vibrate in the vibration mode (basic vibration) shown in FIG. 3A. FIG. 5A is a schematic perspective view for illustrating vibration states of the respective pendulums 21a, 21b, 22a, and 22b when an angular velocity around the X-axis acts on the frame 10. On the other hand, FIG. 5B is a schematic perspective view for illustrating vibration states of the respective pendulums 21a, 21b, 22a, and 22b when an angular velocity around the Y-axis acts on the frame 10.

When an angular velocity around the X-axis acts on the frame 10 vibrating in the basic vibration, as shown in FIG. 5A, in the respective pendulums 21a, 21b, 22a, and 22b, Coriolis forces F1 are generated in directions orthogonal to vibration directions at that point of time. With this, one pair of the pendulums 21a and 22b adjacent to each other in the X-axis direction are deformed to a positive direction of the Z-axis due to the Coriolis forces F1 and then the amounts of deformation are detected by the detection electrodes 71a and 72b. Further, the other pair of the pendulums 22a and 21b adjacent to each other in the X-axis direction are deformed to a negative direction of the Z-axis due to the Coriolis forces F1 and then the amounts of deformation are detected by the detection electrodes 72a and 71b.

Figure 5B:
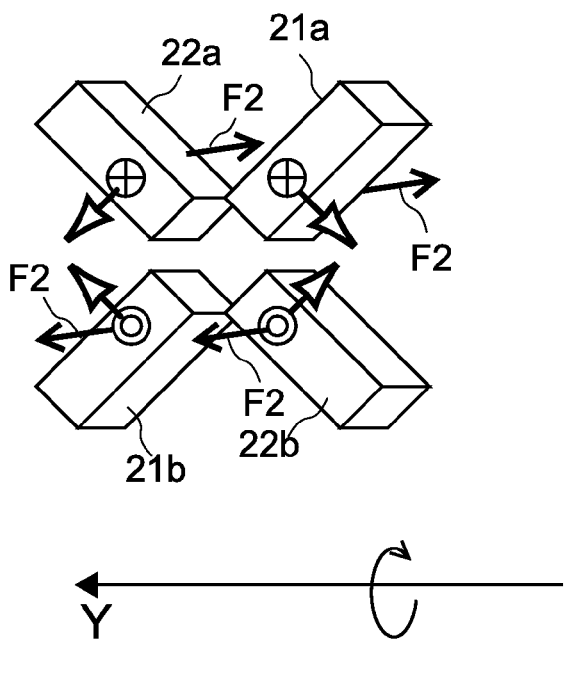

On the other hand, when an angular velocity around the Y-axis acts on the frame 10 vibrating in the basic vibration, as shown in FIG. 5B, in the respective pendulums 21a, 21b, 22a, and 22b, Coriolis forces F2 are generated in directions orthogonal to vibration directions at that point of time. With this, one pair of the pendulums 21a and 22a adjacent to each other in the Y-axis direction are deformed to a negative direction of the Z-axis due to the Coriolis forces F2 and then the amounts of deformation are detected by the detection electrodes 71a and 72a. Further, the other pair of the pendulums 21b and 22b adjacent to each other in the Y-axis direction are deformed to a positive direction of the Z-axis due to the Coriolis forces F2 and then the amounts of deformation are detected by the detection electrodes 71b and 72b.

Also in the case where an angular velocity is generated around an axis in a direction obliquely intersecting the X-axis or the Y-axis, the angular velocity is detected by the same principle as described above. In other words, the pendulums 21a, 21b, 22a, and 22b are deformed due to Coriolis forces corresponding to an X-direction component and a Y-direction component of the angular velocity and then, the amounts of deformation are detected by the detection electrodes 71a, 71b, 72a, and 72b. A drive circuit of the angular velocity sensor 1 detects, based on the outputs from those detection electrodes, an angular velocity around the X-axis and an angular velocity around the Y-axis. In this manner, an angular velocity around an arbitrary axis parallel to the XY-plane can be detected.

[Drive Circuit]

Figure 6:
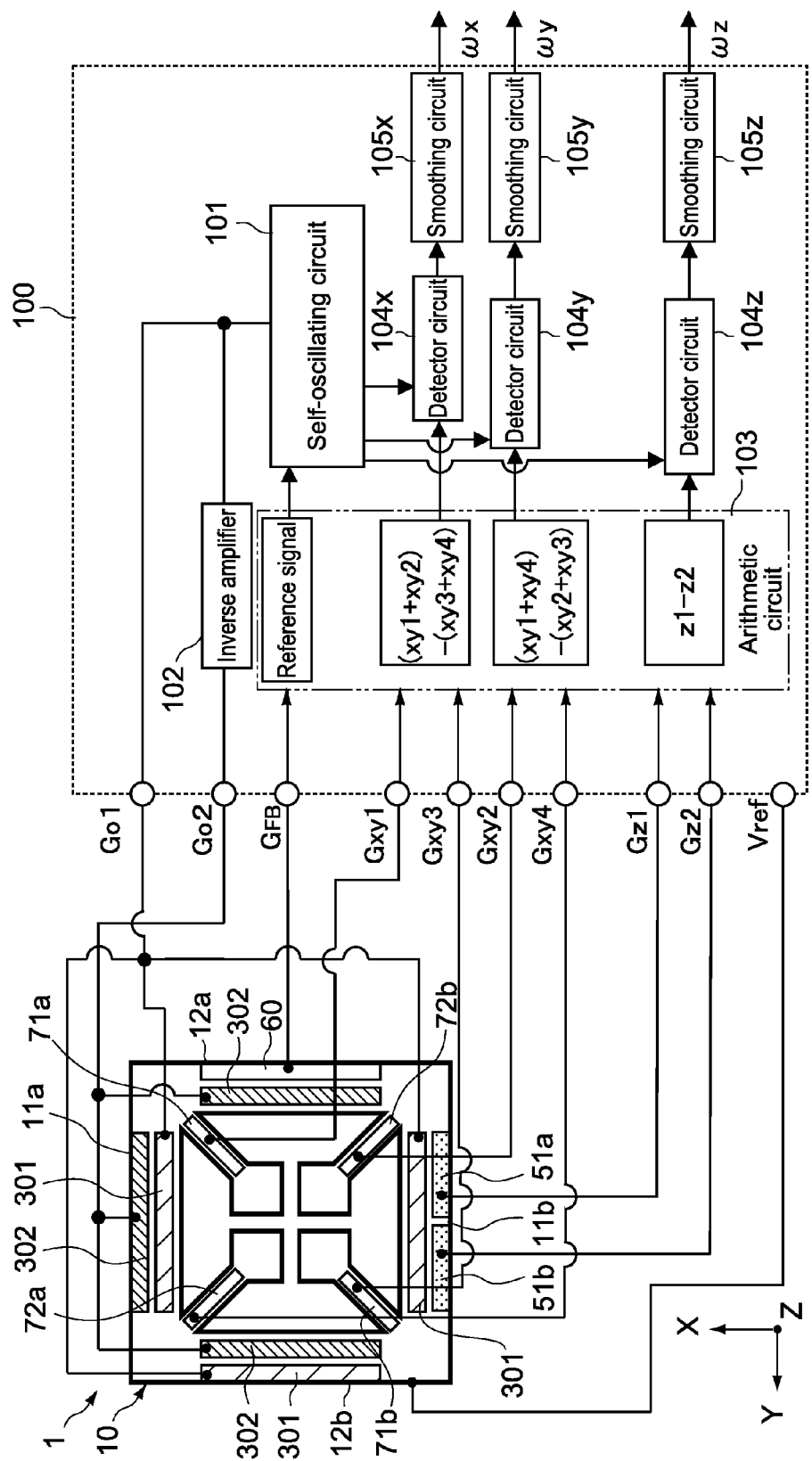
FIG. 6 is a block diagram showing a drive circuit of the angular velocity sensor.

FIG. 6 is a block diagram showing a drive circuit 100 of the angular velocity sensor 1. In FIG. 6, for the sake of convenience, the beams 11a, 11b, 12a, and 12b of the frame 10 are linearly shown and further, illustration of the support mechanism 80 is omitted.

The drive circuit 100 includes a Go1 terminal, a Go2 terminal, a GFB terminal, and a Vref terminal. The Go1 terminal is connected to the upper electrode layers of the first drive electrodes 301. The Go2 terminal is connected to the upper electrode layers of the second drive electrodes 302. The GFB terminal is connected to the reference electrode 60. The Vref terminal is connected to the lower electrode layers of the drive electrodes 301 and 302 and to the lower electrode layers of the detection electrodes 51a, 51b, 71a, 71b, 72a, and 72b.

The drive circuit 100 further includes a Gxy1 terminal, a Gxy2 terminal, a Gxy3 terminal, a Gxy4 terminal, a Gz1 terminal, and a Gz2 terminal, which are electrically connected to the respective detection electrodes of the angular velocity sensor 1. The Gxy1 terminal is connected to the detection electrode 71a of the pendulum 21a and the Gxy2 terminal is connected to the detection electrode 72b of the pendulum 22b. The Gxy3 terminal is connected to the detection electrode 71b of the pendulum 21b and the Gxy4 terminal is connected to the detection electrode 72a of the pendulum 22a. Further, the Gz1 terminal is connected to the detection electrode 51a of the frame 10 and the Gz2 terminal is connected to the detection electrode 51b of the frame 10.

In the drive circuit 100, the Go1 terminal is connected to an output end of a self-oscillating circuit 101. The self-oscillating circuit 101 generates drive signals (alternating-current signals) for driving the drive electrodes 301 and 302. The Go2 terminal is connected to the output end of the self-oscillating circuit 101 via an inverse amplifier 102. The inverse amplifier 102 inverts the phases of the drive signals generated in the self-oscillating circuit 101. With this, the first drive electrodes 301 and the second drive electrodes 302 are stretched and contracted in opposite phase to each other. The Vref terminal is connected to a predetermined reference potential. The reference potential may be a ground potential or a constant offset potential.

The drive circuit 100 further includes an arithmetic circuit 103, detector circuits 104x, 104y, and 104z, and smoothing circuits 105x, 105y, and 105z. The GFB terminal, the Gxy1 terminal, the Gxy2 terminal, the Gxy3 terminal, the Gxy4 terminal, the Gz1 terminal, and the Gz2 terminal are connected to an input end of the arithmetic circuit 103.

The arithmetic circuit 103 generates, based on an output voltage of the reference electrode 60, which is supplied via the GFB terminal, a reference signal and outputs the reference signal to the self-oscillating circuit 101. The arithmetic circuit 103 includes a first differential circuit for generating an angular velocity signal around the X-axis, a second differential circuit for generating an angular velocity signal around the Y-axis, and a third differential circuit for generating an angular velocity signal around the Z-axis. An output of the detection electrode 71a is denoted by xy1, an output of the detection electrode 72b is denoted by xy2, an output of the detection electrode 71b is denoted by xy3, an output of the detection electrode 72a is denoted by xy4, an output of the detection electrode 51a is denoted by z1, and an output of the detection electrode 51b is denoted by z2. At this time, the first differential circuit calculates (xy1+xy2)−(xy3+xy4) and outputs the calculated value to the detector circuit 104x. The second differential circuit calculates (xy1+xy4)−(xy2+xy3) and outputs the calculated value to the detector circuit 104y. Further, the third differential circuit calculates (z1−z2) and outputs the calculated value to the detector circuit 104z.

The detector circuits 104x, 104y, and 104z subject the above-mentioned differential signals to full-wave rectification in synchronism with the drive signals from the self-oscillating circuit 101 or the reference signal in order to obtain direct current signals. The smoothing circuits 105x, 105y, and 105z smooth the outputs of the detector circuits. A direct current voltage signal ωx output from the smoothing circuit 105x contains information on the magnitude and direction of the angular velocity around the X-axis. Further, a direct current voltage signal ωy output from the smoothing circuit 105y contains information on the magnitude and direction of the angular velocity around the Y-axis. In addition, a direct current voltage signal ωz output from the smoothing circuit 105z contains information on the magnitude and direction of the angular velocity around the Z-axis. In other words, the magnitudes of the direct current voltage signals ωx, ωy, and ωz with respect to the reference voltage (Vref) correspond to the information on the magnitudes of the angular velocities and the polarities of the direct current voltages correspond to the information on the directions of the angular velocities.

As described above, according to this embodiment, the angular velocities around the axes of the X-axis direction, the Y-axis direction, and the Z-axis direction can be detected based on the respective deformations, in an XZ-plane, a YZ-plane, and the XY-plane, of the frame 10 vibrating in the XY-plane. With this, it becomes possible to detect, with high accuracy, the angular velocities around the three axes of the X-axis direction, the Y-axis direction, and the Z-axis direction without increasing a thickness dimension. In addition, it becomes possible to achieve a reduction in thickness of the sensor.

Further, the angular velocity sensor according to this embodiment is incorporated in an electronic apparatus such as a digital still camera, a video camera, a virtual reality apparatus, or a car navigation system and widely used as a sensor component for shake detection, operation detection, direction detection, and the like. In particular, according to this embodiment, it is possible to achieve a reduction in size and thickness of the sensor, and hence it is also possible to sufficiently satisfy demands for a reduction in size, thickness, and the like of the electronic apparatus.

[Support Mechanism]

Next, the support mechanism 80 will be described.

The support mechanism 80 includes, as shown in FIG. 1, a base portion 81 and a plurality of joint portions 82a, 82b, 82c, and 82d.

The base portion 81 is constituted of an annular frame body including an inner peripheral portion surrounding an outside of the frame 10. In this embodiment, the base portion 81 is constituted of a square frame body having a longitudinal direction in the X-axis direction and a lateral direction in the Y-axis direction. The joint portions 82a to 82d are formed between the frame 10 and the base portion 81. In other words, the joint portions 82a to 82d join between the connections 13a to 13d of the frame 10 and the inner peripheral portion 81a of the base portion 81.

Each of the joint portions 82a to 82d is formed of a beam bent in the XY-plane and includes a first end portion w1, a second end portion w2, a first bend portion wa, and a second bend portion wb.

The first end portion w1 linearly extends from each of the connections 13a to 13d toward the connection portion opposed to it in the Y-axis direction. The second end portions w2 are respectively connected to the inner peripheral portions 81a and 81b of the two sides of the base portion 81, the two sides being parallel to the X-axis direction. In the example shown in the drawing, the second end portions w2 of the joint portions 82a and 82b are connected to one inner peripheral portion 81a and the second end portions w2 of the joint portions 82c and 82d are connected to the other inner peripheral portion 81b.

Each of the first bend portions wa is positioned between the first end portion w1 and the second end portion w2 and is formed so as to be bent back by about 180 degrees from the first end portion w1 toward the base portion 81. Each of the second bend portions wb is positioned between the second end portion w2 and the first bend portion wa and is formed so as to be bent back by about 180 degrees from the second end portion w2 toward the frame 10. An area between the first bend portion wa and the second bend portion wb is formed by appropriately bending it substantially along the inner peripheral portion of the base portion 81.

The extending direction of the first end portion w1 is not limited only to the Y-axis direction and may be the X-axis direction. By setting the extending direction of the first end portion w1 to the Y-axis direction or the X-axis direction, the shape of the angular velocity sensor 1 is symmetric with respect to the Y-axis direction or the X-axis direction, and hence it becomes easy to adjust the vibration properties of the frame 10. As a matter of course, it is not limited thereto, and a first end portion extending in the Y-axis direction and a first end portion extending in the X-axis direction may be provided. It should be noted that although the first end portion may be formed to extend obliquely to the Y-axis direction or the X-axis direction, if the first end portion is formed along the Y-axis direction or the X-axis direction, it becomes advantageous for a reduction in size of the elements.

By configuring the joint portions 82a to 82d as described above, it becomes possible to achieve a reduction in size of the angular velocity sensor 1. FIG. 7 are plan views for comparing the size of the angular velocity sensor 1 according to this embodiment with the size of an angular velocity sensor 2 according to another embodiment of the present disclosure. FIG. 7A shows the angular velocity sensor 1 and FIG. 7B shows the angular velocity sensor 2.

The angular velocity sensor 2 shown for comparison includes a frame 110 having a square shape and four joint portions 182a, 182b, 182c, and 182d that fix the frame 110 to a fixing portion (not shown). The frame 110 is constituted of, for example, a pair of first linear beams 111a and 111b and a pair of second linear beams 112a and 112b as in the first embodiment.

Here, a case where the outer shape of the frame 10 of the angular velocity sensor 1 is set to a square S having a size corresponding to the size of the frame 110 of the angular velocity sensor 2 will be discussed. In the angular velocity sensor 2, the beams 111a, 111b, 112a, and 112b are linearly formed and hence, for example, the joint portions 182a to 182d need to be formed in an outer area of the frame 110, the outer area being denoted by L2. In contrast, in the angular velocity sensor 1, due to the fact that each of the beams 11a, 11b, 12a, and 12b is formed to have a bow shape and the first end portions w1 of the joint portions 82a to 82d are linearly formed as described above, for example, the joint portions 82a to 82d can be formed within a range denoted by L1 smaller than L2.

In other words, the center portion of each beam of the frame projects to the inside of the frame so as to have a bow shape and in contrast, the recess portion having a bow shape is formed on the outside of the center portion of each beam. By arranging a part of each of the joint portions in this recess portions, the joint portion can be compactly arranged. Thus, it becomes possible to reduce the size of the angular velocity sensor.

In the angular velocity sensor 1 according to this embodiment, the joint portions 82a to 82d are, as shown in FIG. 1, each provided with two bend portions wa and wb. With this, the elasticity of the joint portions 82a to 82d is lowered and thus, following vibration of the frame 10, the joint portions 82a to 82d can be deformed. Thus, it is possible to support the frame 10 without prohibiting straining and deformation due to the vibration mode of the frame 10 and the Coriolis forces. Such action can be similarly obtained also in the angular velocity sensor 2.

In the angular velocity sensor 1 according to this embodiment, as shown in FIG. 1, the bend portions wa and wb are arranged in the recess portions 11t and 12t on the outside of each beam of the frame 10. With this, in a gap between each of the four connections 13a to 13d of the frame 10 and the base portion 81, one beam of each of the joint portions 82a to 82d is enabled to be arranged. It is possible to reduce the size of the angular velocity sensor 1 and, at the same time, to ensure driving/detecting properties because the elasticity of the joint portions 82a to 82d is maintained.

As described above, according to this embodiment, it is possible to achieve a reduction in size of the angular velocity sensor. Further, with the angular velocity sensor 1 according to this embodiment, it is possible to reduce the size of a space between the beams 11a, 11b, 12a, and 12b and the pendulums 21a, 21b, 22a, and 22b. Therefore, for example, in the case where the frame 10 is formed of one silicon substrate by an etching technique, it is possible to reduce an area to be removed by etching and to realize stable etching because coarse/fine distribution of an etching area becomes small. With this, it becomes possible to form the angular velocity sensor with high accuracy.

In addition, with the angular velocity sensor 1 according to this embodiment, it is possible to prevent the detection sensibility of the angular velocity from being fluctuated due to external impact and to substantially reduce influence of disturbance such as vibration or impact acting on the electronic apparatus, for example.

Next, referring to FIG. 1, in two sides of the base portion 81, which are opposed to each other in the Y-axis direction, terminal arrays consisting of a plurality of terminal portions 83 are arranged. In each of those sides of the base portion 81, the terminal portions 83 are arranged in parallel in the X-axis direction. Each of the terminal portions 83 is electrically connected to a land on the wiring substrate (not shown).

The terminal arrays of the terminal portions 83 may be arranged in the two sides of the base portion 81, which are opposed to each other in the X-axis direction. Alternatively, in each side of the base portion 81, a terminal array as described above may be arranged.

The connection mode is not particularly limited and a flip chip method or a wire bonding method may be employed as the connection mode. In this embodiment, the flip chip method of electrically and mechanically connecting the respective terminal portions 83 to the land on the wiring substrate is employed.

The plurality of terminal portions 83 are connected via wires (not shown) so as to individually correspond to the drive electrodes 301 and 302, the detection electrodes 51a, 51b, 71a, 71b, 72a, and 72b, the reference electrode 60, another reference electrode, and the like on the frame 10. Those wires are passed along a surface of the frame 10, surfaces of the arm portions L of the respective pendulums 21a, 21b, 22a, and 22b, surfaces of the respective joint portions 82a to 82d, and a surface of the base portion 81.

In addition, between the inner peripheral portions 81a and 81b of the base portion 81 and the terminal arrays of the terminal portions 83, grooves 84a and 84b are formed. Each of the grooves 84a and 84b extends through the base portion 81 in the Z-axis direction and is formed along the X-axis direction. Those grooves 84a and 84b are provided for suppressing vibration between the base portion 81 and the frame 10, which are fixed on the wiring substrate via the respective terminal portions 83, from being transmitted. It should be noted that formation of the grooves 84a and 84b may be omitted depending on needs.

In the angular velocity sensor 1 having the above-mentioned configuration, it is possible to suppress transmission of disturbance acting on the angular velocity sensor 1, for example, transmission of external impact acting on the electronic apparatus via the wiring substrate to the angular velocity sensor 1, by using the grooves 84a and 84b. With this, it is possible to suppress the vibration properties of the angular velocity sensor 1 from being fluctuated and to maintain a stable angular velocity detection property.

Further, formation of the grooves 84a and 84b also suppresses transmission of vibration from the frame 10 to the base portion 81, and hence it is possible to eliminate an adverse affect on other electronic components on the wiring substrate.

Figure 8:
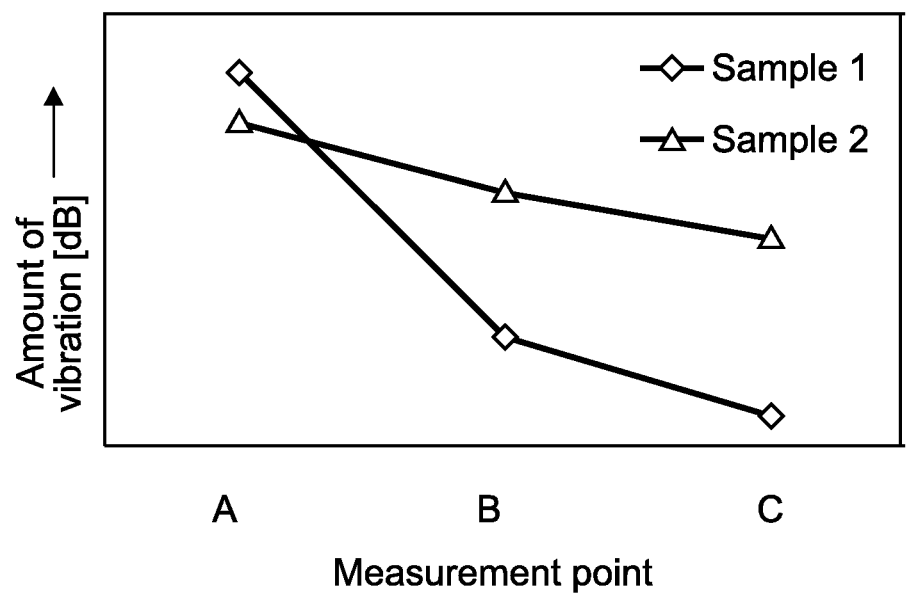
FIG. 8 shows one result of experimentation in which the vibration properties of two angular velocity sensors having different configurations are evaluated.

FIG. 8 shows one result of experimentation in which two angular velocity sensors having different configurations are mounted on wiring substrates and the frames are subjected to the basic vibration in order to evaluate the amount of vibration in each of predetermined points. Sample 1 corresponds to the angular velocity sensor 1 shown in FIG. 7A and Sample 2 corresponds to the angular velocity sensor shown in FIG. 7B. Measurement point A was set to one arbitrary pendulum of each of the angular velocity sensors and Measurement point B was set to an end portion on a base portion side of a joint portion connecting the frame and the base portion. Further, Measurement point C was set to an arbitrary point on the wiring substrate. As shown in FIG. 8, Sample 1 can substantially reduce the amounts of vibration in Measurement points B and C in comparison with Sample 2.

In addition, in the case where the wiring substrate incorporating the angular velocity sensor 1 is reflow-mounted on a control substrate of an electronic apparatus, it is possible to suppress thermal deformation of the wiring substrate due to a reflow temperature from influencing the frame 10. With this, it is possible to suppress the vibration properties of the frame 10 before and after reflow mounting from being fluctuated.

Second Embodiment

Figure 9:
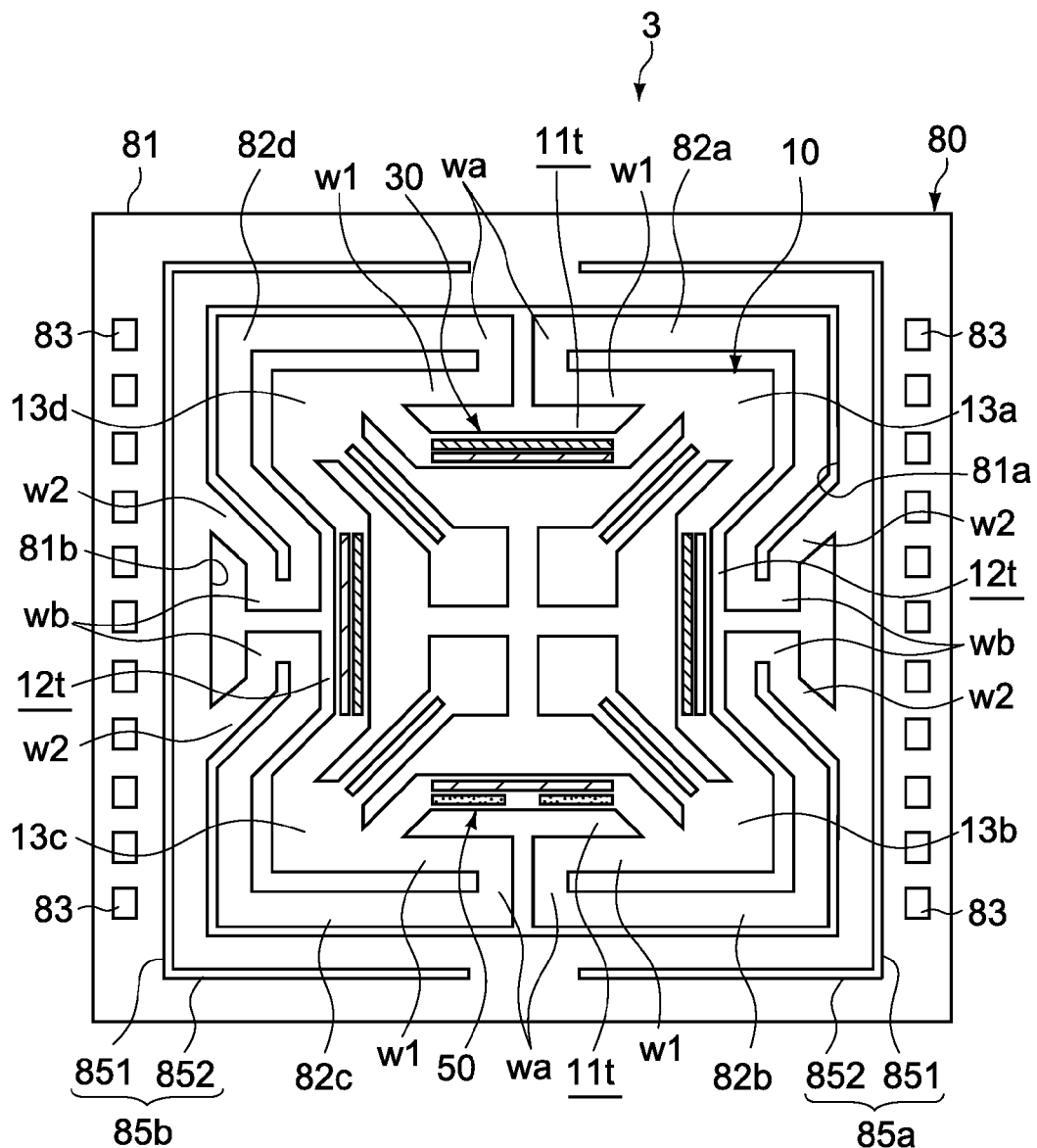
FIG. 9 is a plan view showing an angular velocity sensor according to a second embodiment of the present disclosure.

FIG. 9 is a plan view showing an entire configuration of an angular velocity sensor according to a second embodiment of the present disclosure. In the following, configurations different from the first embodiment will be mainly described, the same configurations as the above-mentioned embodiment will be denoted by the same reference symbols, and the description thereof will be omitted or simplified.

An angular velocity sensor 3 according to this embodiment includes a groove 85a formed between the inner peripheral portion 81a of the base portion 81 and the terminal array of the terminal portions 83 and a groove 85b formed between the inner peripheral portion 81b of the base portion 81 and the terminal array of the terminal portions 83. In this embodiment, the grooves 85a and 85b extend through the base portion 81 in the Z-axis direction and each include a first groove portion 851 formed along the X-axis direction and second groove portions 852 formed in continuous with the first groove portion 851 along the Y-axis direction. Those grooves 85a and 85b are provided for suppressing transmission of vibration between the base portion 81 and the frame 10, which are fixed on the wiring substrate via the respective terminal portions 83.

In FIG. 9, the grooves 85a and 85b are symmetrically formed on the base portion 81. In this embodiment, in the grooves 85a and 85b, distal ends of the groove portions 852 extending from both ends of one groove portion 851 and distal ends of the groove portions 852 extending from both ends of the other groove portion 851 are formed so as to be opposed to each other at center portions in two sides of the base portion 81, the two sides being parallel to each other in the Y-axis direction. With this, a portion between the frame 10 and an outer peripheral portion of the base portion 81 is, in substantially the entire periphery, separated by the grooves 85a and 85b. Gaps between the one groove portions 852 and the other groove portions 852 that are opposed to each other form passages through which a plurality of wiring patterns that connect between the plurality of terminal portions 83 and a plurality of electrodes on the frame 10 are passed.

According to this embodiment, the grooves 85a and 85b are formed so as to surround the substantially entire periphery of the frame 10, and hence it becomes possible to substantially reduce transmission of vibration between the base portion 81 and the frame 10. With this, it is possible to make the vibration properties of the frame 10 stable and to ensure a highly accurate angular velocity detection property.

Third Embodiment

Figure 10:
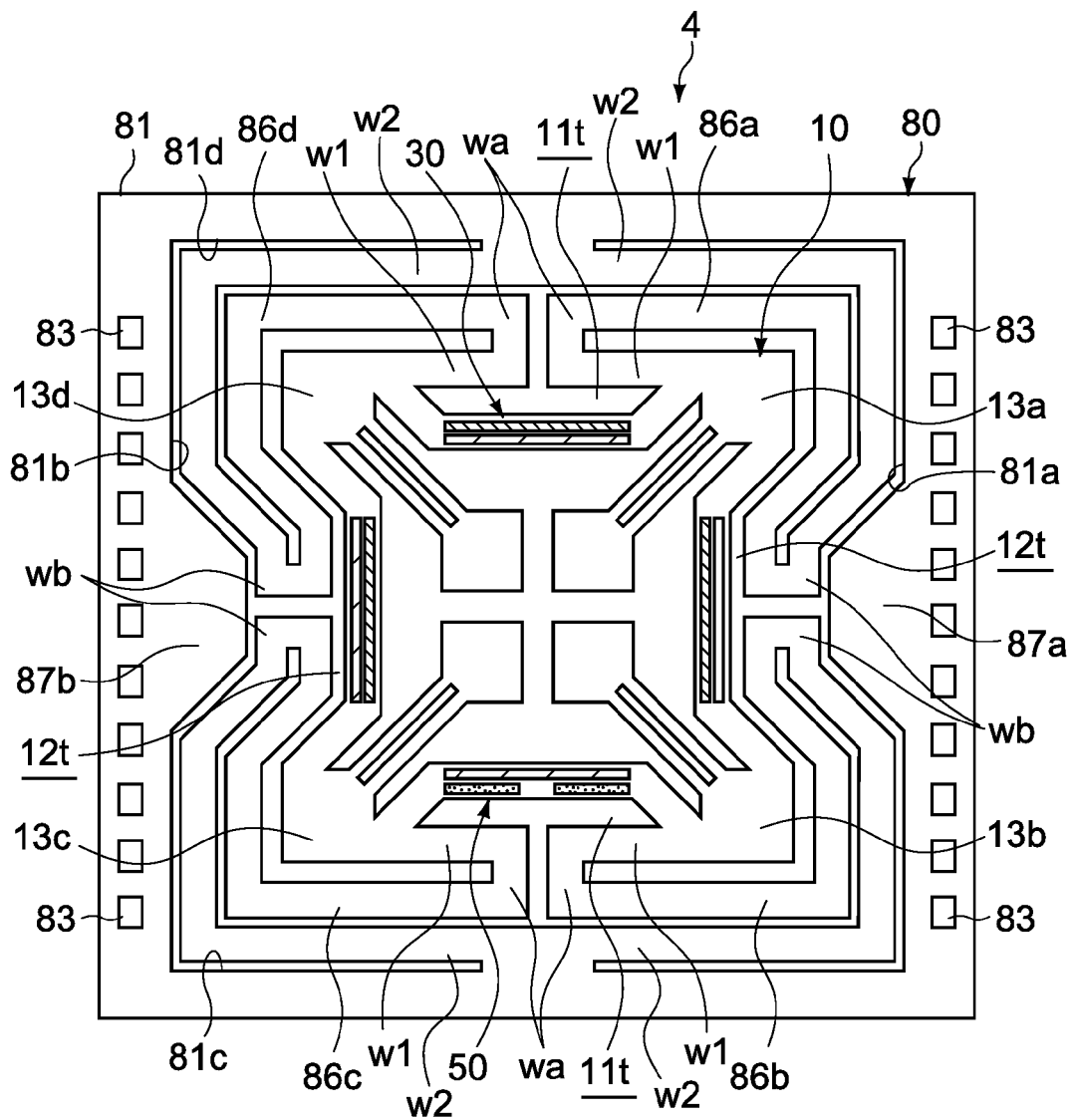
FIG. 10 is a plan view showing an angular velocity sensor according to a third embodiment of the present disclosure.

FIG. 10 is a plan view showing an entire configuration of an angular velocity sensor according to a third embodiment of the present disclosure. In the following, configurations different from the first embodiment will be mainly described, the same configurations as the above-mentioned embodiment will be denoted by the same reference symbols, and the description thereof will be omitted or simplified.

An angular velocity sensor 4 according to this embodiment includes joint portions 86a, 86b, 86c, and 86d that join between the frame 10 and the base portion 81. Each of the joint portions 86a to 86d is formed of a beam bent in the XY-plane and includes a first end portion w1, a second end portion w2, a first bend portion wa, and a second bend portion wb.

The first end portion w1 linearly extends from each of the connections 13a to 13d toward the connection portion opposed to it in the Y-axis direction. The second end portion w2 is connected to each of inner peripheral portions 81c and 81d in two sides of the base portion 81, the two sides being parallel to the Y-axis direction. In the example shown in the drawing, the second end portions w2 of the joint portions 86a and 86d are integrated with each other and connected to one inner peripheral portion 81d and the second end portions w2 of the joint portions 86b and 86c are integrated with each other and connected to the other inner peripheral portion 81d.

Each of the first bend portions wa is positioned between the first end portion w1 and the second end portion w2 and is formed so as to be bent back by about 180 degrees from the first end portion w1 toward the base portion 81. Each of the second bend portions wb is positioned between the second end portion w2 and the first bend portion wa and is formed so as to be bent back by about 180 degrees from the second end portion w2 toward the frame 10. An area between the first bend portion wa and the second bend portion wb is formed by appropriately bending it substantially along the inner peripheral portion of the base portion 81.

In this embodiment, as shown in FIG. 10, the bend portions wa and wb are arranged in the recess portions 11t and 12t on the outside of the respective beams of the frame 10. Further, in a gap between each of the four connections 13a to 13d of the frame 10 and the base portion 81, two beams of each of the joint portions 86a to 86d are arranged.

In addition, in this embodiment, in the inner peripheral portions 81a and 81b of the two sides of the base portion 81, projecting portions 87a and 87b that project toward the frame 10 are formed, the two sides being parallel in the X-axis direction. Those projecting portions 87a and 87b are opposed to an outer periphery of the second bend portions wb of the respective joint portions 86a to 86d via a predetermined gap.

With the angular velocity sensor 4 according to this embodiment configured as described above, it is possible to obtain the same action as that of the angular velocity sensor 3 according to the second embodiment. Further, according to this embodiment, the length of the joint portions 86a to 86d can be increased, and hence it is possible to form the sensor in a compact size and to support the frame 10 without prohibiting straining and deformation due to the vibration mode of the frame 10 and the Coriolis forces.

As described above, although the embodiments of the present disclosure are described, it is needless to say that the present disclosure is not limited only to the above-mentioned embodiments and various modifications can be made without departing from the gist of the present disclosure.

Figure 11:
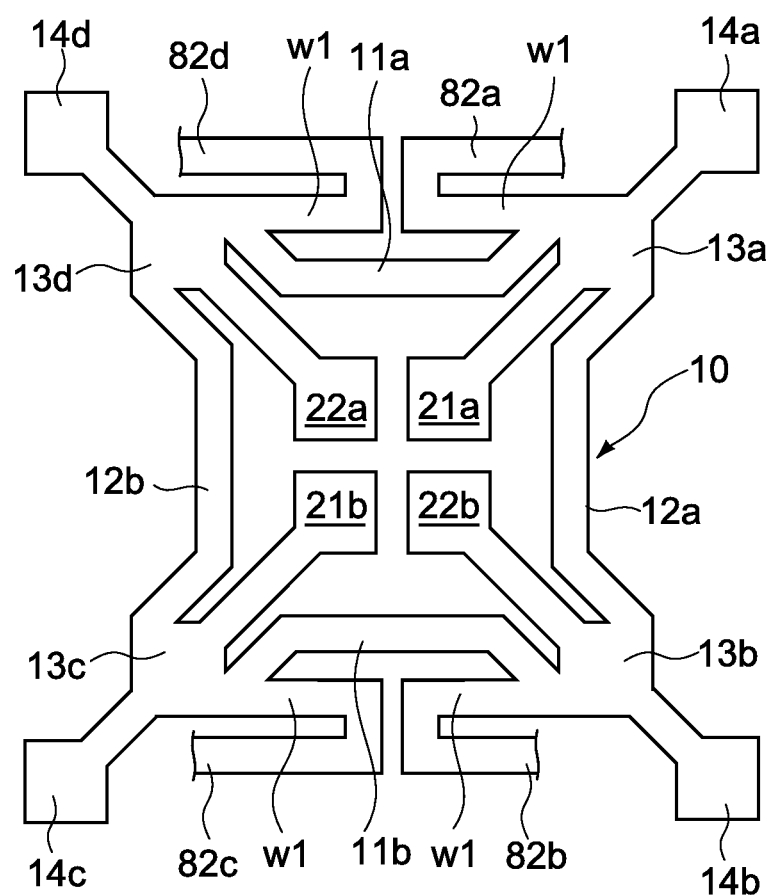
FIG. 11 is a plan view of main parts, which shows a modified example of the angular velocity sensor.

For example, as shown in FIG. 11, the connections 13a to 13d of the frame 10 may be provided with a plurality of weights 14a, 14b, 14c, and 14d corresponding to the pendulums 21a, 21b, 22a, and 22b. The weights 14a to 14d function as counter weights of the pendulums 21a, 21b, 22a, and 22b. With this, it becomes easy to adjust the vibration properties (resonance frequency, detuning, etc.) of each of the pendulums 21a, 21b, 22a, and 22b.

Figure 12:
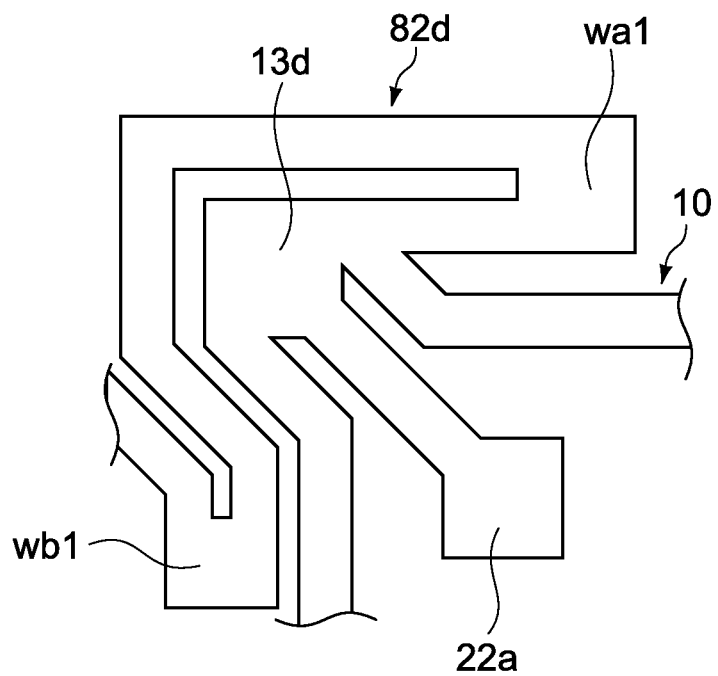
FIG. 12 is a plan view of main parts, which shows another modified example of the angular velocity sensor.

Alternatively, as shown in FIG. 12, for example, bend portions wa1 and wb1 of a joint portion 82d may be formed to be wider and those portions may be set to function as a counter weight as described above.

It should be noted that the present disclosure can be also configured as follows.

In an embodiment, an angular velocity sensor is provided. The angular velocity sensor includes an annular frame including a pair of first beams that extend in a first direction and are opposed to each other in a second direction orthogonal to the first direction, a pair of second beams that extend in the second direction and are opposed to each other in the first direction, and a plurality of connections configured to connect between the pair of first beams and the pair of second beams;

a drive unit configured to vibrate the frame in a first plane, to which the first direction and the second direction belong, in a vibration mode in which when one pair of the pair of first beams and the pair of second beams move closer to each other, the other pair move away from each other, and when the one pair move away from each other, the other pair move closer to each other;

a first detector configured to detect, based on the amount of deformation of the frame in the first plane, an angular velocity around an axis of a third direction orthogonal to the first plane, the frame vibrating in the vibration mode; and a support mechanism including an annular base portion including an inner peripheral portion surrounding an outside of the frame, and a plurality of joint portions configured to join between the inner peripheral portion and the plurality of connections.

In the embodiment, each of the plurality of joint portions includes a first end portion that is connected to one of the plurality of connections, a second end portion that is connected to the inner peripheral portion, and a structural portion that is provided between the first end portion and the second end portion and includes at least a bend portion.

In an embodiment, the base portion includes a terminal array including a plurality of terminal portions that are arranged along one of the first direction and the second direction, and a groove formed along the terminal array between the terminal array and the inner peripheral portion.

In an embodiment, the base portion is a square frame body including two sides opposed to each other in the first direction and two sides opposed to each other in the second direction, and the groove includes first groove portions that are formed in the two sides opposed to each other in the first direction, and second groove portions that are formed in the two sides opposed to each other in the second direction and communicate with the first groove portions.

In an embodiment, the pair of first beams includes a pair of first beam portions including first curved portions that form first recesses by projecting to a direction in which the first curved portions are opposed to each other, and the pair of second beams includes a pair of second beam portions including second curved portions that form second recesses by projecting to a direction in which the second curved portions are opposed to each other.

In an embodiment, at least a part of the plurality of joint portions is positioned in one of the first recess and the second recess.

In an embodiment, first pendulums are provided in a pair of first connections in a diagonal relationship out of the plurality of connections and vibrate in synchronism with vibration of the frame in the first plane;

second pendulums are provided in a pair of second connections in a diagonal relationship out of the plurality of connections and vibrate in synchronism with vibration of the frame in the first plane; and a second detector is configured to detect angular velocities around axes of two predetermined directions in the first plane, based on the amounts of deformation of the first pendulums and the second pendulums in a direction orthogonal to the first plane.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An angular velocity sensor, comprising:

an annular frame including a pair of first beams that extend in a first direction and are opposed to each other in a second direction orthogonal to the first direction, a pair of second beams that extend in the second direction and are opposed to each other in the first direction, and a plurality of connections configured to connect between the pair of first beams and the pair of second beams;

a drive unit configured to vibrate the frame in a first plane, to which the first direction and the second direction belong, in a vibration mode in which when one pair of the pair of first beams and the pair of second beams move closer to each other, the other pair move away from each other, and when the one pair move away from each other, the other pair move closer to each other;

a first detector configured to detect, based on the amount of deformation of the frame in the first plane, an angular velocity around an axis of a third direction orthogonal to the first plane, the frame vibrating in the vibration mode; and a support mechanism including an annular base portion including an inner peripheral portion surrounding an outside of the frame, and a plurality of joint portions configured to join between the inner peripheral portion and the plurality of connections.

2. The angular velocity sensor according to claim 1, wherein each of the plurality of joint portions includes a first end portion that is connected to one of the plurality of connections, a second end portion that is connected to the inner peripheral portion, and a structural portion that is provided between the first end portion and the second end portion and includes at least a bend portion.

3. The angular velocity sensor according to claim 2, wherein the base portion includes
a terminal array including a plurality of terminal portions that are arranged along one of the first direction and the second direction, and
a groove formed along the terminal array between the terminal array and the inner peripheral portion.

4. The angular velocity sensor according to claim 3, wherein the base portion is a square frame body including two sides opposed to each other in the first direction and two sides opposed to each other in the second direction, and
the groove includes
first groove portions that are formed in the two sides opposed to each other in the first direction, and
second groove portions that are formed in the two sides opposed to each other in the second direction and communicate with the first groove portions.

5. The angular velocity sensor according to claim 1, wherein the pair of first beams includes a pair of first beam portions including first curved portions that form first recesses by projecting to a direction in which the first curved portions are opposed to each other, and the pair of second beams includes a pair of second beam portions including second curved portions that form second recesses by projecting to a direction in which the second curved portions are opposed to each other.

6. The angular velocity sensor according to claim 5, wherein at least a part of the plurality of joint portions is positioned in one of the first recess and the second recess.

7. The angular velocity sensor according to claim 1, further comprising:

first pendulums that are provided in a pair of first connections in a diagonal relationship out of the plurality of connections and vibrate in synchronism with vibration of the frame in the first plane;

second pendulums that are provided in a pair of second connections in a diagonal relationship out of the plurality of connections and vibrate in synchronism with vibration of the frame in the first plane; and a second detector configured to detect angular velocities around axes of two predetermined directions in the first plane, based on the amounts of deformation of the first pendulums and the second pendulums in a direction orthogonal to the first plane.

* * * * *